(12) United States Patent
Carnevali

(10) Patent No.: US 7,914,059 B2
(45) Date of Patent: Mar. 29, 2011

(54) RECONFIGURABLE CONSOLE MOUNT HAVING A PLURALITY OF INTERCHANGEABLE MOUNTING PANELS WITH JOINTS THEREBETWEEN

(76) Inventor: Jeffrey D. Carnevali, Seattle, WA (US)

(*) Notice: Subject to any disclaimer, the term of this patent is extended or adjusted under 35 U.S.C. 154(b) by 136 days.

(21) Appl. No.: 12/378,760

(22) Filed: Feb. 19, 2009

(65) Prior Publication Data

US 2010/0090488 A1   Apr. 15, 2010

Related U.S. Application Data

(63) Continuation-in-part of application No. 12/287,622, filed on Oct. 10, 2008, now Pat. No. 7,802,832.

(51) Int. Cl.
*B60R 13/00* (2006.01)
(52) U.S. Cl. .................................................. 296/24.34
(58) Field of Classification Search ............... 296/24.34, 296/37.8, 70; 361/829; D12/415
See application file for complete search history.

(56) References Cited

U.S. PATENT DOCUMENTS

| | | | | |
|---|---|---|---|---|
| 1,417,401 | A * | 5/1922 | Mahoney ..................... | 312/297 |
| D218,438 | S | 8/1970 | Shook et al. | |
| 3,550,001 | A | 12/1970 | Hanley | |
| 3,955,701 | A * | 5/1976 | Fisch ........................... | 220/3.7 |
| 3,984,161 | A | 10/1976 | Johnson | |
| 4,313,646 | A * | 2/1982 | Millhimes et al. ............ | 439/654 |
| 4,473,166 | A * | 9/1984 | Breiter ......................... | 220/693 |
| D279,329 | S | 6/1985 | Dzak | |
| 4,733,900 | A | 3/1988 | Fluharty | |
| 4,846,382 | A | 7/1989 | Foultner et al. | |
| 5,005,898 | A | 4/1991 | Benedetto et al. | |
| 5,174,621 | A | 12/1992 | Anderson | |
| 5,181,555 | A | 1/1993 | Chruniak | |
| 5,199,772 | A | 4/1993 | Jordan | |
| 5,259,655 | A * | 11/1993 | Anderson ..................... | 296/70 |
| 5,282,556 | A | 2/1994 | Bossert | |
| 5,418,836 | A * | 5/1995 | Yazaki ...................... | 455/569.2 |
| D363,916 | S * | 11/1995 | Johnson ..................... | D12/415 |
| 5,503,565 | A * | 4/1996 | McCoy ....................... | 439/171 |
| 5,536,079 | A * | 7/1996 | Kostic ........................ | 312/265.3 |
| 5,548,489 | A * | 8/1996 | Reed et al. .................. | 361/827 |
| 5,680,974 | A * | 10/1997 | Vander Sluis ............... | 296/37.9 |
| 5,743,585 | A * | 4/1998 | Pranger et al. ............. | 296/37.12 |
| 5,903,698 | A * | 5/1999 | Poremba et al. ............. | 385/135 |
| 6,048,020 | A | 4/2000 | Gronowicz et al. | |
| D425,475 | S | 5/2000 | Herer | |
| 6,062,623 | A * | 5/2000 | Lemmen ..................... | 296/37.8 |
| 6,086,129 | A | 7/2000 | Gray | |
| D429,209 | S * | 8/2000 | Inchaurregui ............... | D12/415 |
| D429,684 | S | 8/2000 | Johnson | |
| 6,123,377 | A | 9/2000 | Lecher et al. | |
| D434,365 | S | 11/2000 | Herer et al. | |
| 6,176,534 | B1 * | 1/2001 | Duncan ...................... | 296/37.8 |
| D437,299 | S | 2/2001 | Johnson | |
| D438,841 | S | 3/2001 | Smith | |
| D443,246 | S | 6/2001 | Smith | |
| D443,855 | S | 6/2001 | Herer et al. | |
| D447,998 | S | 9/2001 | Pfeiffer et al. | |
| D453,318 | S | 2/2002 | Moore | |
| 6,388,881 | B2 * | 5/2002 | Yamauchi et al. ............ | 296/70 |

(Continued)

*Primary Examiner* — Kiran B. Patel
(74) *Attorney, Agent, or Firm* — Charles J. Rupnick, Attorney at Law

(57) ABSTRACT

A reconfigurable vehicle console having a plurality of interchangeable overlapping blank and equipment mounting face plates, including both tongue-and-groove joints between adjacent face plates, as well as optional lap joints.

18 Claims, 9 Drawing Sheets

U.S. PATENT DOCUMENTS

| | | |
|---|---|---|
| 6,428,072 B1 | 8/2002 | Moore |
| 6,709,041 B1 | 3/2004 | Hotary et al. |
| 7,165,687 B1 * | 1/2007 | Stevens et al. ............. 211/86.01 |
| 7,210,725 B2 * | 5/2007 | Moore ....................... 296/24.34 |
| 7,407,210 B2 * | 8/2008 | Arbaugh et al. ............ 296/24.34 |
| 2005/0035618 A1 * | 2/2005 | Toth et al. .................. 296/24.34 |
| 2009/0072565 A1 * | 3/2009 | Mayne, Jr. .................. 296/24.34 |
| 2010/0115858 A1 * | 5/2010 | Olsen ............................ 52/79.1 |

* cited by examiner

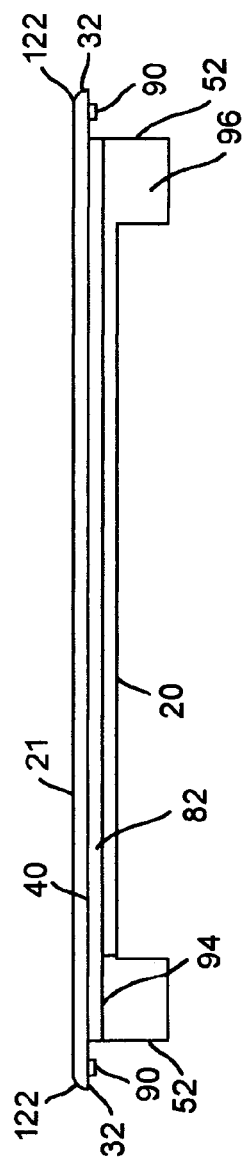
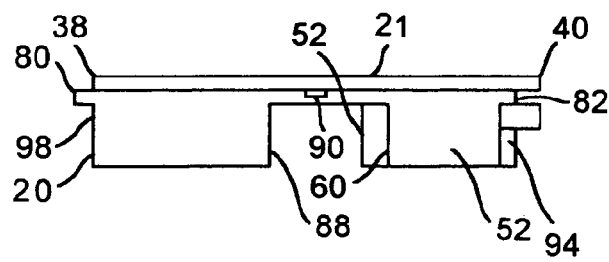

RECONFIGURABLE CONSOLE MOUNT HAVING A PLURALITY OF INTERCHANGEABLE MOUNTING PANELS WITH JOINTS THEREBETWEEN

This application is a Continuation-in-part patent application Ser. No. 12/287,622 filed in the name of the same inventor on Oct. 10, 2008, now U.S. Pat. No. 7,802,832 which is incorporated herein by reference.

FIELD OF THE INVENTION

The present invention relates to vehicle consoles and in particular to one that provides novel reconfigurable equipment mounting features, the console being mountable within a vehicle driver compartment to support either mechanical, electrical or electromechanical equipment in a location easily accessible to an operator of the vehicle.

BACKGROUND OF THE INVENTION

Police officers, public safety officers, firefighters, paramedics and the like carry various types of equipment in their vehicles. Several pieces of equipment are often carried in a single vehicle, and the driver often needs to operate the equipment while simultaneously driving the vehicle. Thus, various devices exist to secure multiple pieces of equipment within a vehicle so that they are accessible to the driver and/or other persons in the vehicle driver compartment.

These devices commonly include a hollow rectangular box situated on the floor of the vehicle between the driver seat and front passenger seat, including a horizontal top portion having an upwardly facing opening for receiving pieces of equipment. Police cruisers, for example, are commonly fitted with equipment boxes of this type. The boxes are used to house various types of equipment and controls used by police officers, such as radios, siren controls and light bar controls. Typically, the boxes are sized and positioned so that most of the box extends between the driver seat and the front seat. Only a small portion, if any, of the box will extend forward toward the dashboard beyond the driver seat and front passenger seat. In some police cruisers, the equipment box extends all the way back to the prisoner partition separating the rear seating area from the driver compartment. A laptop computer is often positioned between the box and dashboard, and is secured to the vehicle floor with various types of mounting hardware.

Systems employing the conventional equipment box described above suffer from a number of problems associated with the structure of the box. The box includes removable multiple blank panels fastened on its top or upwardly facing surface. Removal of one or more of these blank panels opens a space where a radio or other piece of equipment can be mounted using brackets that fasten between the piece of equipment and opposing side panels of the box. Unfortunately, the equipment mounting brackets fasten to the box side panels using screws so the equipment is not easily repositioned within the bore or changed out for different pieces of equipment. Furthermore, the blank panels are simple rectangles of heavy sheet metal with squared edges that form butt joints between adjacent panels so gaps are formed between the mounted equipment and adjacent blank panels, and between side by side blank panels when no equipment is mounted.

The conventional equipment box configuration described above makes it more difficult to remove a piece of equipment from this box, or reposition it along closer to one or another of the end panels. The configuration also permits cards and other slim objects such as driver's licenses to slip through the gaps between the mounted equipment and adjacent blank panels, and between side by side blank panels.

SUMMARY OF THE INVENTION

The present invention is a reconfigurable vehicle console having a plurality of interchangeable overlapping blank and equipment mounting face plates, including both tongue-and-groove joints between adjacent face plates, as well as optional lap joints.

According to one aspect of the reconfigurable vehicle console includes a pair or opposing substantially rigid side panels, each side panel having a wall portion formed with a mounting lip portion formed along a length thereof. A pair of opposing substantially rigid end panels are substantially rigidly interconnected between opposing end portions of the side panels and spacing apart the side panels a substantially uniform distance. A plurality of substantially rectangular interchangeable face plates of the console, wherein each face plate is formed with a pair of spaced apart nesting lip portions each positioned to mate with the mounting lip portion of one of the spaced apart side panels, a tongue positioned along a first joining edge of the face plate between the spaced apart nesting lip portions, a support lip positioned along a second joining edge of the face plate between the spaced apart nesting lip portions and opposite from the tongue and positioned to mate in a lap joint with the tongue of a different one of the face plates, and a pair of first and second fastener clearance passages formed between inner and outer surfaces of the face plate. At least one of the face plates includes a cutout formed between the inner and outer surfaces of the face plate and sized to receive an equipment piece at least partially therethrough, and first and second substantially upright projections positioned on the inner surface of the face plate between the first and second joining edges and inwardly of respective nesting lip portions, each projection includes a pair of fastener receivers positioned on opposite sides of the respective clamp actuator clearance passage and spaced outwardly thereof along the respective nesting lip portion and toward the first and second joining edges of the face plate. A plurality of removable fasteners are operable through a respective one of the fastener clearance passages of one of the face plates, each fastener being operable with a portion of the mounting lip portion of the respective side panel for securing the respective nesting lip portions of the face plates thereto.

According to another aspect of the reconfigurable vehicle console, each of the face plates further includes a contour formed on each nesting lip portion thereof with the contour further extending substantially continuously between the first and second joining edge of the face plate.

According to another aspect of the reconfigurable vehicle console, a plurality of substantially rigid L-brackets are included and each being formed with a substantially rigid equipment interface portion and a substantially rigid face plate interface portion substantially rigidly interconnected by a substantially rigid right angle portion forming a substantially right angle therebetween, wherein the equipment interface portion further includes a plurality of substantially parallel equipment interface slots oriented substantially perpendicularly of the right angle portion, and wherein the face plate interface portion further includes a pair of face plate interface slots oriented substantially perpendicularly of the right angle portion and positioned to substantially align with the pair of fastener receivers of the substantially upright projections positioned on the inner surface of the face plate.

According to another aspect of the reconfigurable vehicle console, each of the L-brackets further includes a plurality of substantially parallel artifacts scoring a surface of the face plate interface portion at substantially regular intervals between the right angle portion and an outer end of the face plate interface portion distal from the right angle portion.

According to another aspect of the reconfigurable vehicle console, one of the opposing end panels further includes a tongue positioned along an edge thereof between the interconnected end portions of the side panels and positioned to mate in a lap joint with the support lip of one of the face plates, and a different one of the first and second end panels further includes a support lip positioned along an edge thereof between the interconnected end portions of the side panels and positioned to mate in a lap joint with the tongue of one of the face plates.

According to another aspect of the reconfigurable vehicle console, the tongue positioned along the first joining edge of the face plate is further offset relative to the outer surface thereof, and the face plate further includes both first and second support lips positioned along the second joining edge thereof and spaced apart to receive the tongue therebetween.

According to another aspect of the reconfigurable vehicle console, one of the opposing end panels further includes a tongue positioned along an edge thereof between the interconnected end portions of the side panels and positioned to be received between the spaced apart first and second support lips of one of the face plates, and a different one of the end panels further includes first and second support lips spaced apart along an edge thereof between the interconnected end portions of the side panels and positioned to receive therebetween the tongue of one of the face plates.

Other aspects of the invention are detailed herein.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein:

FIG. 2 is an exemplary side view of one equipment mounting face plate;

FIG. 3 is an exemplary end view of one equipment mounting face plate;

FIG. 4 is exemplary bottom view of one equipment mounting face plate;

DETAILED DESCRIPTION OF PREFERRED EMBODIMENT

In the Figures, like numerals indicate like elements.

Figure 1:
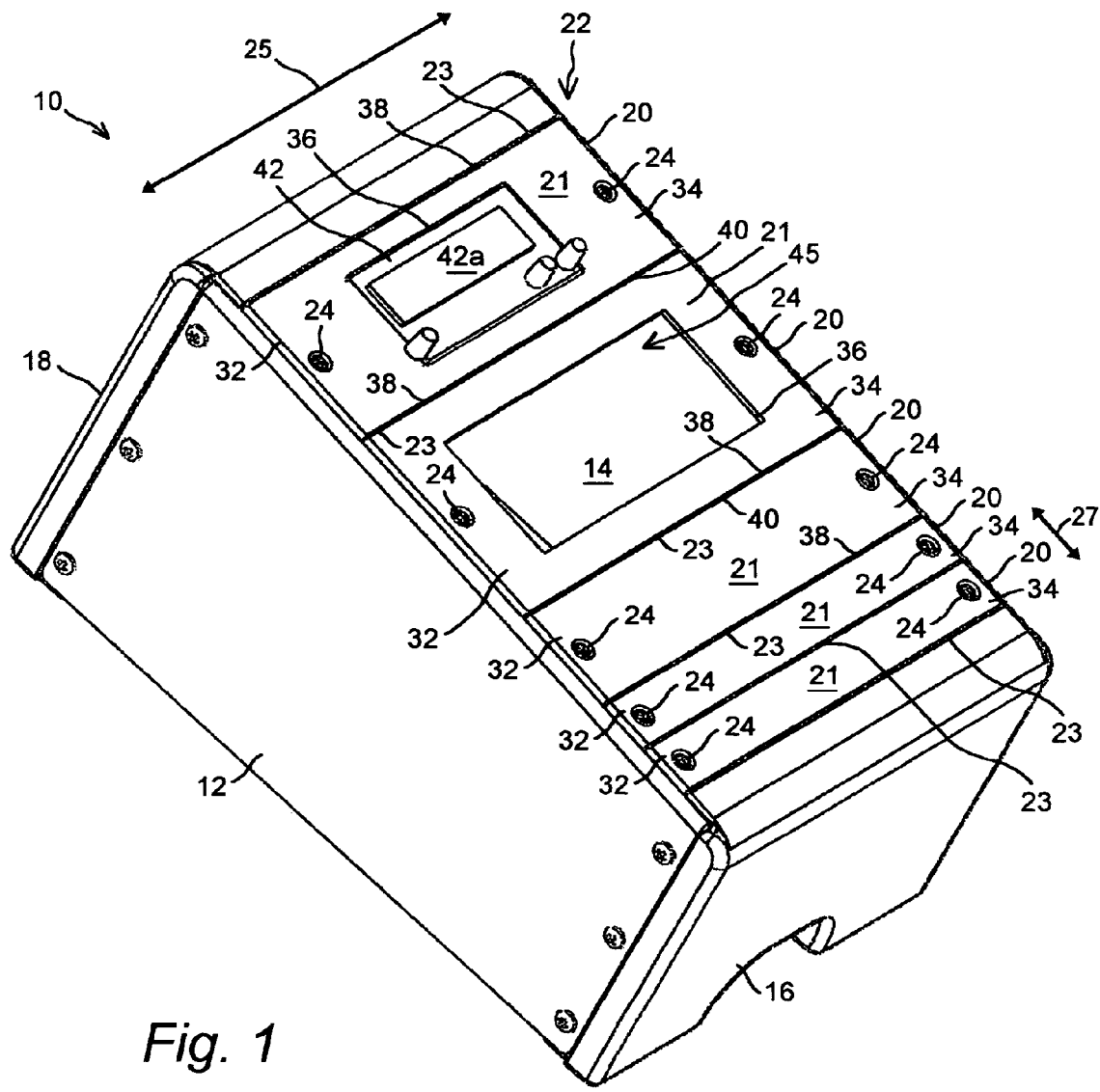
FIG. 1 is a perspective view showing an example of the novel reconfigurable vehicle console.

FIG. 1 is a perspective view that illustrates a novel reconfigurable vehicle console 10 having opposing first and second substantially rigid side panels 12 and 14 each configured for being secured to the drive shaft floor hump of the vehicle using, for example using an interface plate attached to the hump and having a plurality of fastener holes spaced along side flanges arranged along the hump. The side panels 12, 14 are substantially rigidly interconnected with opposing first and second substantially rigid end panels 16 and 18.

The end panels 16, 18 are substantially the same width such that the side panels 12, 14 are spaced apart a substantially uniform or constant distance between the end panels 16, 18, thereby forming a substantially rectangular support frame.

A plurality of substantially interchangeable face plates 20 are removably clamped to the side panels 12, 14 of the rectangular support frame between the opposing end panels 16, 18. For example, a plurality of the interchangeable face plates 20 are removably clamped between the side panels 12, 14 with respective substantially planar external or outer surfaces 21 partially forming a top or upwardly facing surface 22 of the console 10 when installed. The face plates 20 are all of a substantially uniform length 25 between the side panels 12, 14, but are optionally formed with any useful width between the end panels 16, 18. However, the face plates 20 are optionally of a minimum unit width 27 or an integral multiple of the minimum unit width 27. By example and without limitation, the all of the face plates 20 are either a minimum width 27 of about 1 inch, for example, or an integer multiple of the minimum 1 inch width 27, i.e., 2 inch, 3 inch, 4 inch, etc.

One or more cutouts 36 are formed in different face plates 20 for receiving an equipment piece 42, such as a radio, global positioning sensor (GPS), or siren and light bar controls, or other control switches. When present, the cutouts 36 are either sized to industry standards for a particular equipment piece 42, else custom sized to match a particular make and model of equipment piece 42. The face plate 20 thus functions as a face plate for the equipment piece 42 being secured thereto, with the cutout 36 functioning as a bezel surrounding an operating face 42a of the equipment piece 42. The cutouts 36 for receiving an equipment piece 42 is substantially the only significant difference between blank face plates 20 and face plates 20 for mounting an equipment piece 42.

Overlapping joints 23 are formed between adjacent face plates 20 along opposing first and second edges 38 and 40 thereof, and additional overlapping joints 23 are formed between end ones of the face plates 20 and respective adjacent end panels 16, 18. In contrast to the butt joints typical in prior art consoles, overlapping joints 23 are distinctly more sealed and secure than such butt joints.

A pair of releasable fasteners 24, such as screws or releasable clamps, secures opposing side nesting lip portions 32 and 34 of each of the face plates 20 to the side panels 12, 14. Optionally, more of the fasteners 24 may be provided for wider face plates 20.

FIG. 2, FIG. 3 and FIG. 4 are exemplary side, end and bottom views, respectively, of one embodiment of face plate 20 having the overlapping joints 23 optionally structured as tongue-and-groove joints. By example and without limitation, the face plate 20 is shown here having a tongue 80 positioned along one of its edges 38 (shown) or 40 and extending most of the length of the face plate 20 between the opposing side nesting lip portions 32, 34. A groove 82 is positioned along the other one of the edges 38 or 40 (shown) of the face plate 20 opposite from the tongue 80. The groove 82 is sized to receive and with mate the tongue 80. The groove 82 also extends most of the length of the face plate 20 between the opposing side nesting lip portions 32, 34 and is at least as long as the tongue 80. The tongue 80 and groove 82 of adjacent face plates 20 are joined to form the tongue-and-groove type overlapping joints 23 between adjacent face plates 20. In the tongue-and-groove type joints 23, the tongue 80 is overlapped both above and below by a pair of spaced apart upper support lip 82a and lower support lip 82b that form the groove 82. The upper support lips 82a are positioned adjacent to or flush with the outer surface 21 of the face plate 20. The tongue 80 and groove 82 of end face plates 20 are joined adjacent with end panels 16, 18 to form additional tongue-and-groove type joints 23 there between.

Locators are provided between the side panels 12, 14 and each face plate 20, as disclosed more fully herein below. Accordingly, each of opposing side nesting lip portions 32, 34 of the face plate 20 is further formed with a detent 90 positioned thereon for locating the face plate 20 on the first and second side panels 12, 14 of the console 10, as disclosed herein. By example and without limitation, the detents 90 are positioned in about the middle of the side nesting lip portions 32, 34 substantially equidistant between the edges 38, 40. The detents 90 are thus substantially aligned with a longitudinal centerline 29 of the face plate 20.

Each face plate 20 is further illustrated to have a pair of substantially upright projections 52 positioned on a substantially planar interior surface 56 thereof. Projections 52 function as mounting structure for the equipment piece 42, as discussed herein below. The upright projections 52 are positioned adjacent to and slightly inwardly of respective opposing side nesting lip portions 32, 34 of the face plate 20. The upright projections 52 are optionally formed as thin walls extended substantially completely across the inner surface 56 of the face plate 20 between its opposing edges 38, 40.

A pair of fastener receivers 58 is positioned to the opposing edges 38, 40 and spaced away therefrom along the respective side nesting lip portions 32, 34. By example and without limitation, the fastener receivers 58 are configured for receiving a threaded fastener thereinto. The fastener receivers 58 are, for example, either blind, smooth bore holes structured for receiving self-tapping screws, or pre-threaded blind holes. Optionally, the fastener receiver junctions 58 are formed in thick bosses 84 that are optionally formed integrally with the projections 52 and configured to reinforce and stiffen the projections 52.

A pair of fastener clearance passages 50 are formed in a thick boss 86 formed on the interior surface 56 of the face plate 20, as illustrated. The bosses 86 and fastener clearance passages 50 therein are each positioned at about the middle of the face plate 20 about equidistant between the longitudinal edges 38, 40. The fastener clearance passages 50 are thus substantially aligned with the detents 90. When the pair of fasteners 24 securing the face plates 20 to the side panels 12, 14 of the console 10 are configured as releasable clamps, a clearance notch 60 is formed through the upright projections 52 in a position between the respective fastener clearance passage 50 and the respective side nesting lip portions 32, 34 for operating the releasable clamp type fasteners 24 there through.

The face plate 20 is further illustrated by example and without limitation to have a first side notch 92 along its tongue edge 38 and a second side notch 94 along its groove edge 40 each adjacent to a respective one of side nesting lip portions 32, 34. Edge portions 96 and 98 of the projections 52 adjacent to respective side nesting lip portions 32, 34 are positioned to coincide with the respective first and second side notches 92, 94 of an adjacent face plate 20 and sized to nest therein. The edge portions 96, 98 of the projections 52 have been found to stiffen the projections 52 and help stabilize the overlapping joints 23 between adjacent face plates 20, but are not necessary for proper functioning of the console 10.

Optionally, the face plate 20 is formed with side edge contours 122, such as rounds or bevels, that avoid dangerous sharp edges and generally smooth the contour of the console 10.

When configure to receive an equipment piece 42, the face plate 20 is additionally formed with one or more cutouts 36 positioned between the side nesting lip portions 32, 34 and opposing first and second edges 38, 40 thereof. The cutouts 36 are sized to receive an equipment piece 42, such as a radio, global positioning sensor (GPS), or siren and light bar controls, there through with the equipment piece 42 being secured to the face plate 20 as disclosed herein. The face plate 20 is thus functions an aesthetic frame and functional support for the equipment piece 42 being secured thereto, with the cutout 36 functioning as a bezel surrounding an operating face 42a of the equipment piece 42.

Figure 5:
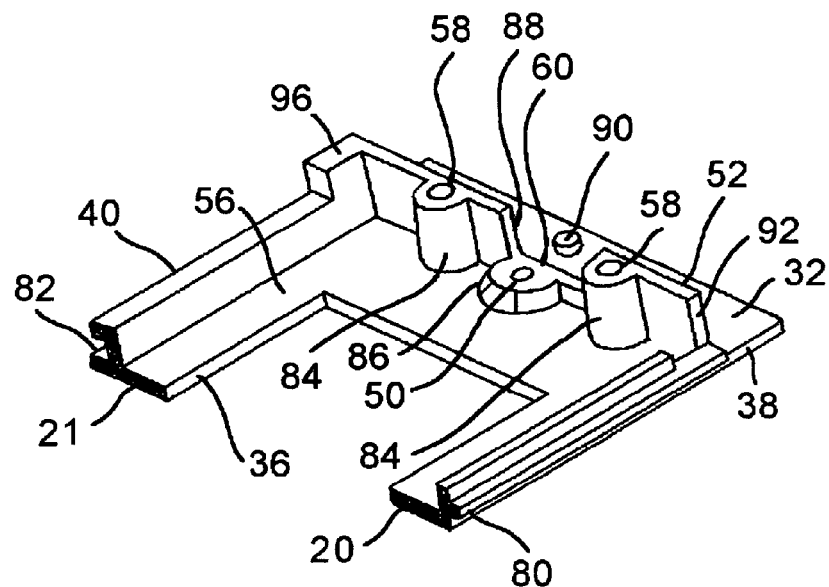
FIG. 5 is a section view taken through one equipment mounting face plate.
Figure 6:
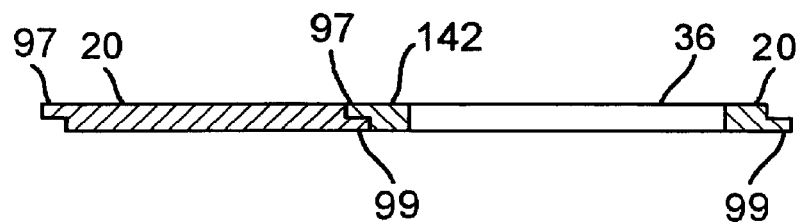
FIG. 6 is a partial cross-section view of the novel reconfigurable vehicle console showing the overlapping joints between adjacent face plates embodied as lap joints.

FIG. 5 is a section view taken through the face plate 20 showing an illustrative partial bottom perspective view with the cutout 36 shown extending through equipment mounting face plate 20 between the exterior surface 21 and interior surface 56 thereof. FIG. 6 illustrates another embodiment of face plate 20 having the overlapping joints 23 alternatively structured as lap joints. Lap type overlapping joints 23 are formed between adjacent face plates 20 along opposing edges 38, 40 thereof. The lap type overlapping joints 23 are also formed between end face plates 20 and an adjacent one of the end panels 16, 18. Lap type overlapping joints 23 are formed of a tongue 97 laying over a lip 99. The tongue 97 is positioned adjacent to or flush with the outer surface 21 of the face plate 20. The lip 99 is positioned opposite from the tongue and adjacent to or flush with the interior surface 56 of the face plate 20. The tongue 97 and lip 99 are optionally both sized about the same, having about the same length and extending about halfway through the thickness of the face plate 20. Optionally, the lip 99 is shorter than the tongue 97 to ensure a smooth, close overlapping joint 23 on the upper surface 22 of the console 10.

Figure 7:
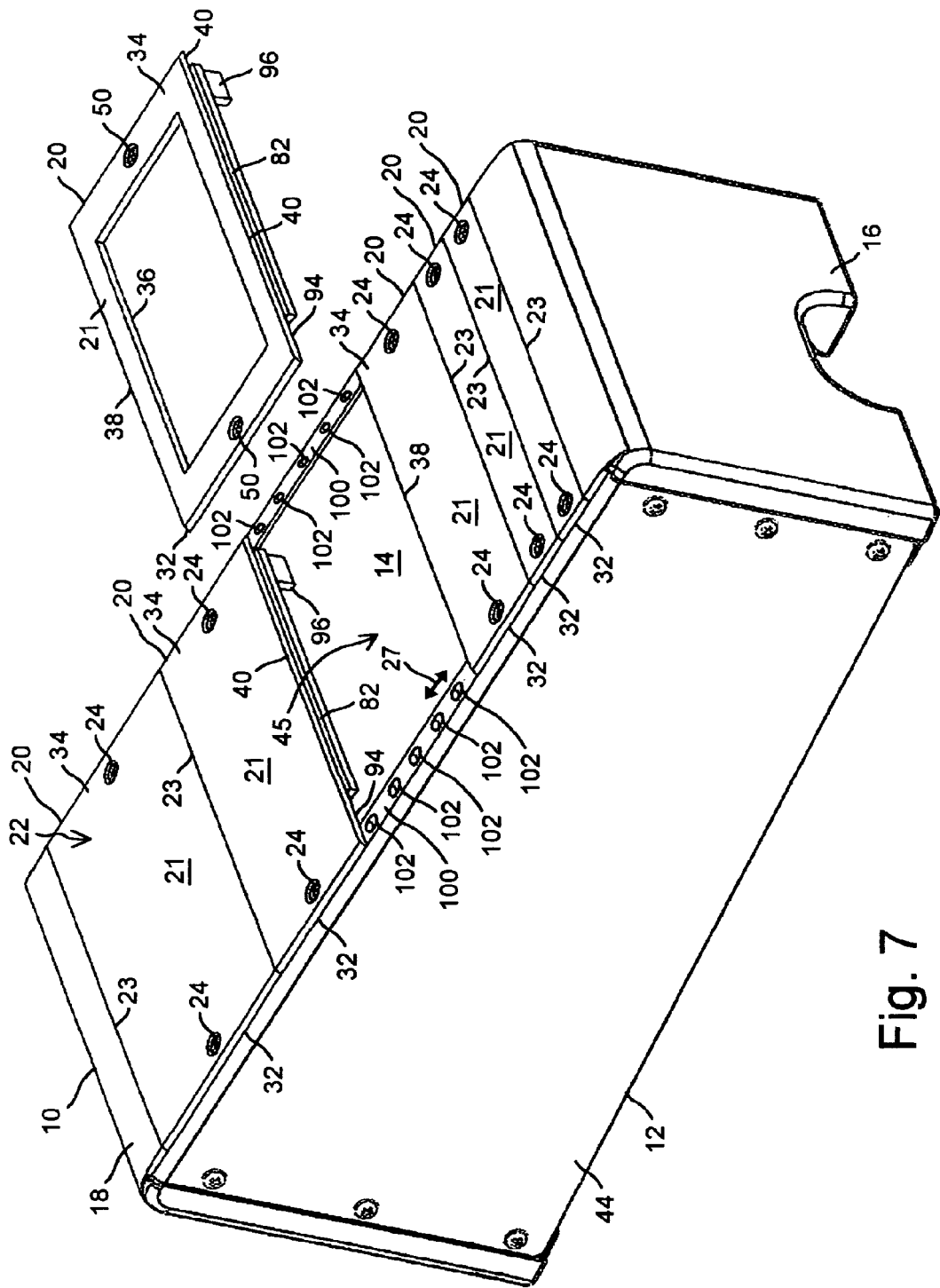
FIG. 7 illustrates installation/removal of one of the removable and interchangeable face plates with the console.

FIG. 7 illustrates installation/removal of one of the face plates 20 with the console 10. As illustrated here, the overlapping joints 23 are formed between adjacent face plates 20 and between end face plates 20 and adjacent console end panels 16, 18. For example, the tongue 80 and groove 82 of each face plate 20 is matable with the groove 82 and tongue 80 of each other face plate 20, and vice versa, to form the tongue-and-groove type overlapping joints 23 there between. The tongue 80 and groove 82 of each face plate 20 is also matable with the tongue and/or groove 80, 82 of the end panels 16, 18 so that any face plate 20 is optionally positioned adjacent to either of the end panels 16, 18 for arranging different blank and equipment bearing face plates 20 as desired. Therefore, the console 10 is optionally fitted with any combination of blank and equipment bearing face plates 20 to suit an end purpose having one or more equipment piece 42 arranged on the console 10 in any order desired.

As illustrated here, side panels 12, 14 are each further formed with an upper mounting lip 100 bent at right angles from a wall portion 44 and facing one another inwardly across the console 10. The mounting lips 100 support the opposing side nesting lip portions 32, 34 of each face plate 20, while providing clamping surfaces for the releasable clamps or other releasable fasteners 24. Clearance for the two projections 52 on the interior surface 54 of the face plate 20 is provided between the upper mounting lips 100 of the side panels 12, 14. Locators are provided between the mounting lips 100 of the side panels 12, 14 and the opposing side nesting lip portions 32, 34 of each face plate 20. For example, the mounting lips 100 are formed with a plurality of upwardly facing detent receivers 102 spaced substantially uniformly there along for receiving the detents 90 formed on the face plates 20. Furthermore, the detent receivers 102 are positioned at substantially uniform intervals substantially equal to the minimum unit width 27 of the face plates 20 so as to receive any face plates 20 of any minimum or multiple width 27 with no significant gaps between adjacent face plates 20. Only by example and without limitation, the detent receivers 102 are formed as holes spaced slightly away the inwardly facing edge of the mounting lip 100. The hole type receivers 102 are sized to receive the detents 90 of any face plate 20. When the face plates 20 are assembled in the vehicle console 10 with the fasteners 24, the detents 90 of the different face plates 20 anchor the side panels 12, 14 by means of the detents 90 being substantially interlocked with the hole type receivers 102 whereby the face plates 20 act as stabilizers between the side panels 12, 14 to stiffen the console 10. Therefore, the side panels can be made thinner and lighter without compromising to the overall stiffness and integrity of the console 10.

Alternatively, the detent receivers 102 are optionally formed as slots or notches that open into the inwardly facing edge of the mounting lip 100. The openings or notches 102 are sized to receive the detents 90 of any of the blank and equipment mounting face plates 20.

After the face plate 20 is mated with the console side panels 12, 14, the fasteners 24 are installed to releasably retain each face plate 20 relative to the upper mounting lips 100. Subsequently, the different blank and equipment bearing face plates 20 can be removed and interchanged at will to arrange and rearrange the console 10 as desired. More equipment pieces 42 can be accommodated by utilizing more of the face plates 20 having the cutouts 36, or some of the equipment bearing face plates can be replaced with non-equipment bearing or blank face plates 20. Alternatively, the different equipment pieces 42 can be accommodated by utilizing different face plates 20 of different sizes with cutouts 36 sized and shaped to receive the different equipment pieces 42. Accordingly, in contrast to prior art consoles, the console 10 is truly reconfigurable.

Figure 8:
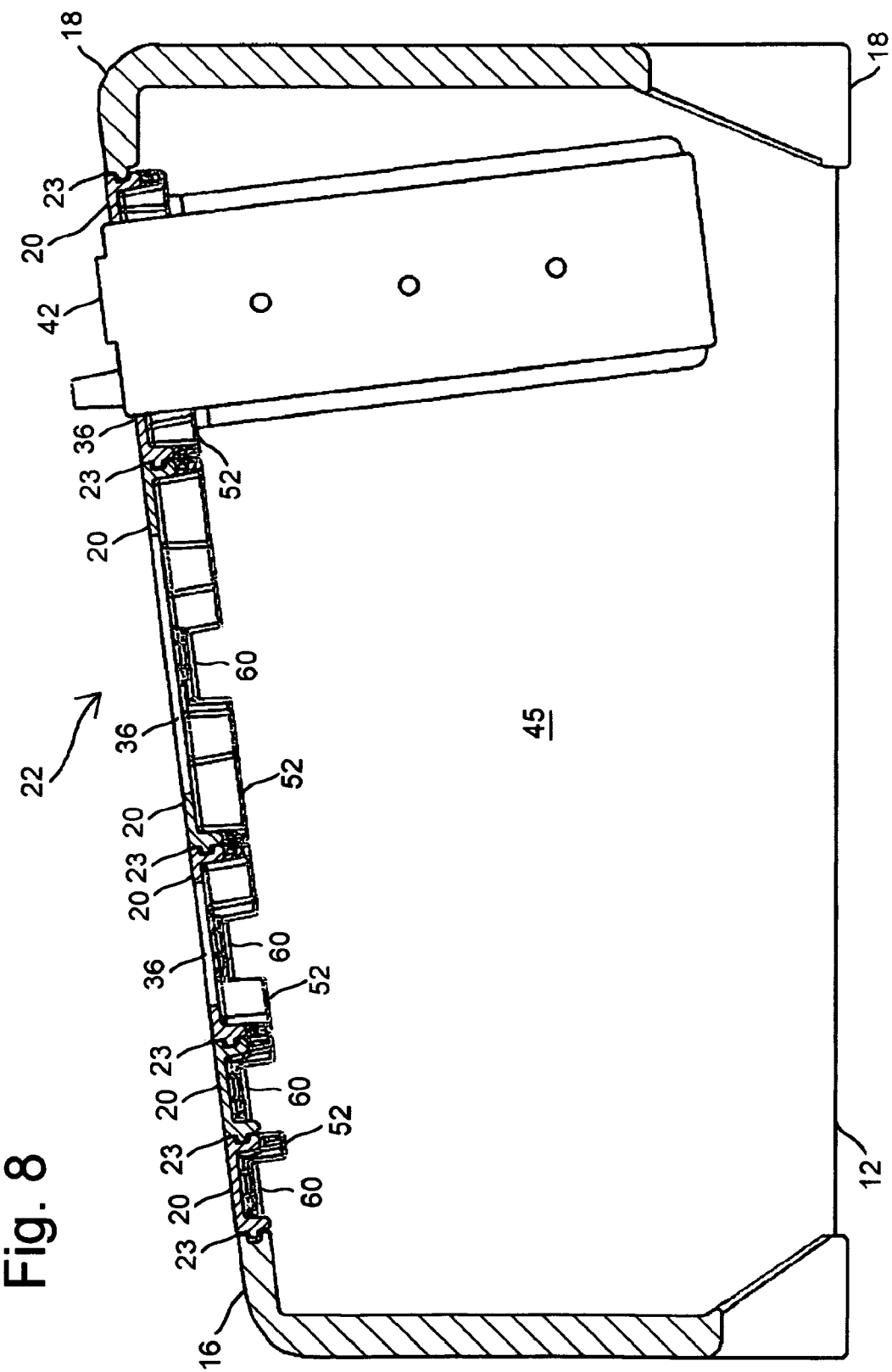
FIG. 8 is a cross-section view of the novel reconfigurable vehicle console showing the overlapping joints between adjacent face plates embodied as tongue-and-groove joints, as disclosed herein.

FIG. 8 is a cross-section view of the console 10 showing the overlapping joints 23 configured as tongue-and-groove joints between adjacent face plates 20, as well as additional tongue-and-groove type overlapping joints 23 between end face plates 20 and adjacent end panels 16, 18, as disclosed herein.

Figure 9:
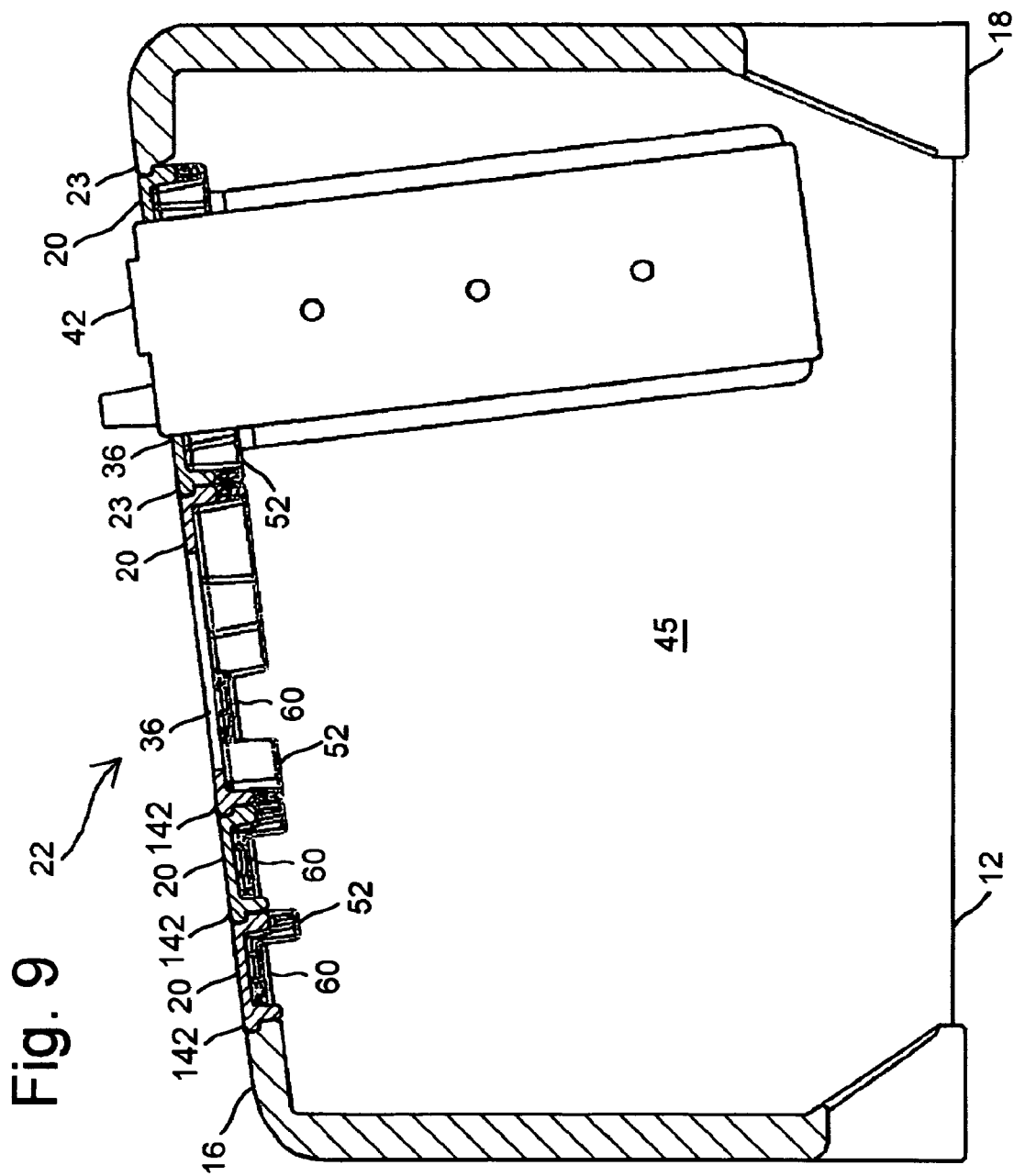
FIG. 9 is a cross-section view of the novel reconfigurable vehicle console showing the overlapping joints between adjacent face plates embodied as lap joints, as disclosed herein.

FIG. 9 is a cross-section view of the console 10 showing the overlapping joints 23 configured as lap joints between adjacent face plates 20, as well as additional lap type joints 23 between end face plates 20 and adjacent end panels 16, 18, as disclosed herein.

Figure 10:
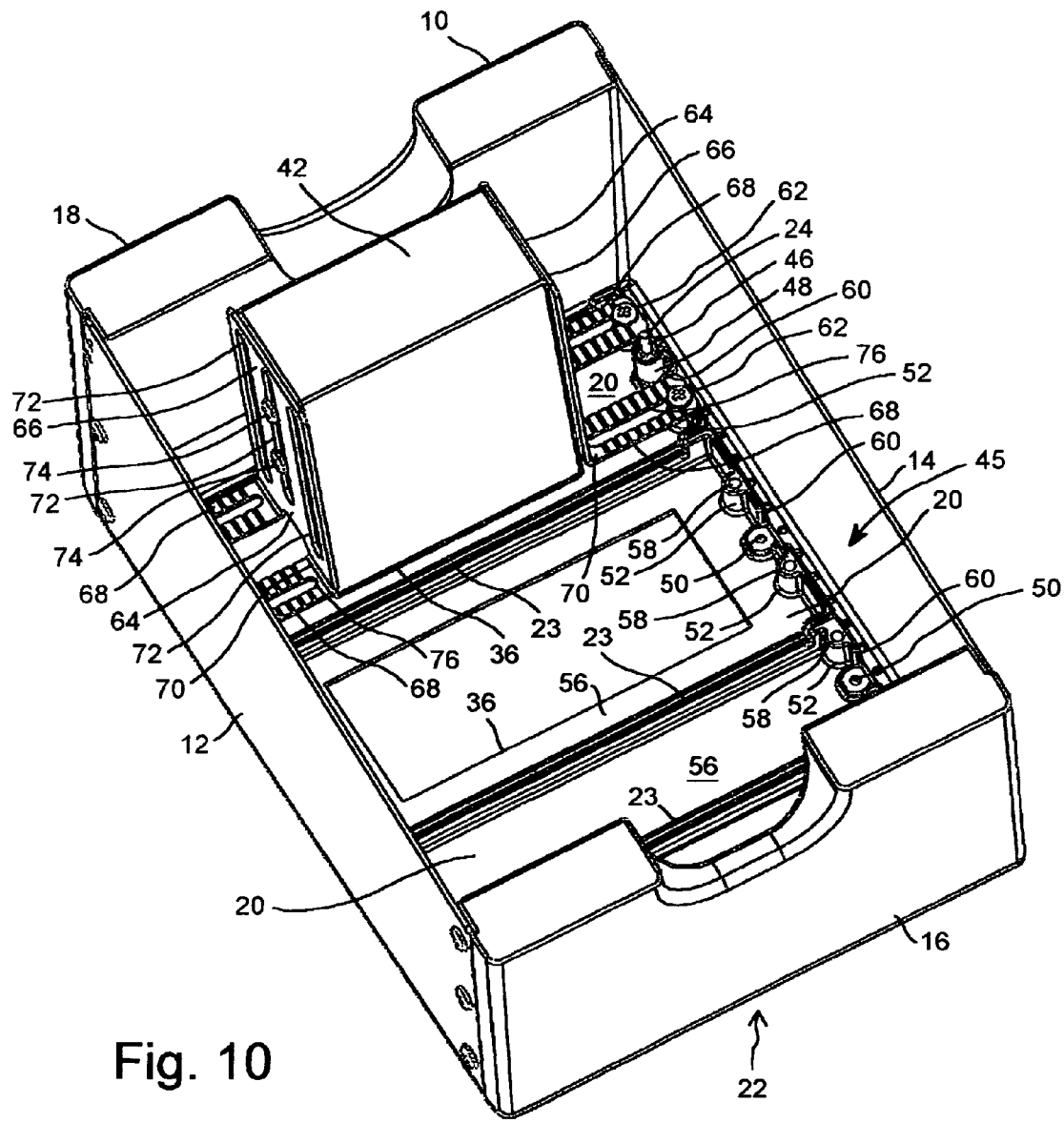
FIG. 10 is a view of the novel reconfigurable vehicle console viewed its underside.

FIG. 10 is a view of the novel reconfigurable vehicle console 10 viewed from the underside opposite from the top or upwardly facing surface 22 and showing the interior portion 45 of the console 10. Here, the fasteners 24 are illustrated as releasable clamps having an actuator 46 operable through one of the receivers 50 for engaging or disengaging a movable jaw portion 48. A pair of fasteners 62 secure the equipment piece 42 to the face plate 20 through a pair of substantially rigid L-brackets 64.

Figure 11:
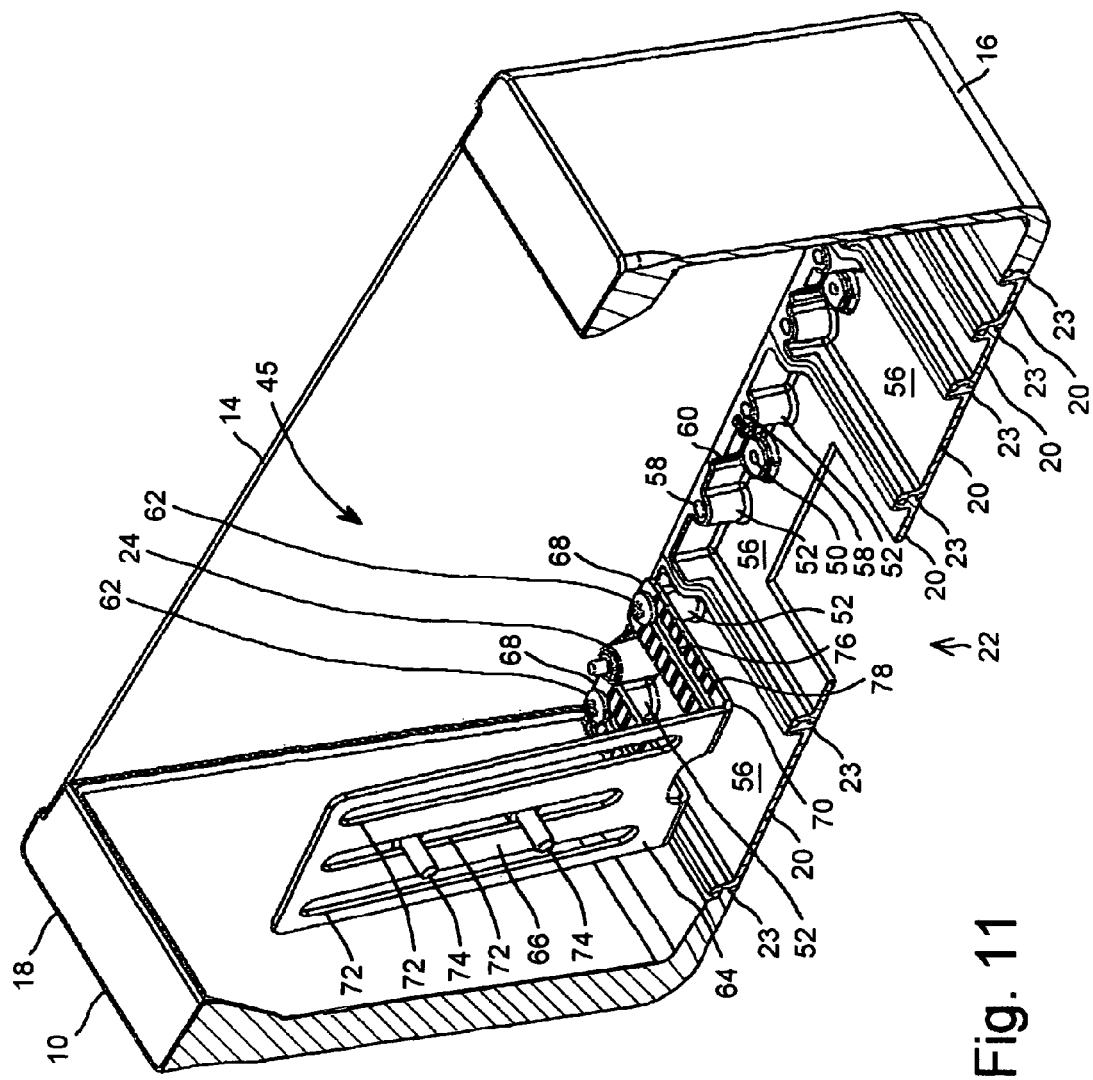
FIG. 11 illustrates one example of a pair of L-brackets that are utilized for securing a piece of equipment relative to a cutout in one of the panels.

FIG. 11 illustrates one example of the pair of substantially rigid L-brackets 64 wherein each is formed of a substantially rigid equipment interface portion 66 and a substantially rigid face plate interface portion 68 that are substantially rigidly interconnected by a substantially rigid angle portion 70 forming a substantially right angle there between. The equipment interface portion 66 is formed with a plurality of substantially parallel equipment interface slots 72 oriented substantially perpendicularly of the right angle portion, and one or more fasteners 74 are utilized for securing the equipment interface portion 66 of each L-bracket 64 to opposite sides of the equipment piece 42.

The face plate interface portion 68 is structured to mount to the face plate 20 by projections 52 thereof. The face plate interface portion 68 is formed with a pair of face plate interface slots 76 oriented substantially perpendicularly of the right angle portion 70 and positioned to substantially align with the pair of fastener receivers 58 of the upright projections 52 positioned on interior surface 56 of the face plate 20. The securing fasteners 62 are received through respective face plate interface slots 76 into the fastener receivers 58 for securing the L-brackets to the inner surface 56 of the face plate 20.

Optionally, the face plate interface portion 68 is split into a pair of spaced apart legs, as shown, each containing one of the pair of face plate interface slots 76. A surface of each leg of the face plate interface portion 68 is optionally further scored by a plurality of substantially parallel grooves or other artifacts 78 across the interface slots 76 at substantially regular intervals between the right angle portion 70 and an outer end of the face plate interface portion 68 distal from right angle portion 70. The scoring grooves 78 are utilized for breaking the legs of the face plate interface portion 68 to a convenient length to fit between the equipment piece 42 mounted on different face plates 20 and the respective side panels 12, 14. The installer merely assembles the equipment piece 42 within one of the cutouts 36 in the face plate 20 using the pair of L-brackets 64, then cuts or breaks off an excess portion of each leg of the face plate interface portion 68 that extends beyond the projections 52 into the zones defined by the respective side nesting lip portions 32, 34. The legs of the face plate interface portion 68 are broken by metal fatigue that occurs by bending along one of the scoring grooves 78, the legs eventually fatigue and break at the scoring groove 78 by repeated bending back an forth. After the legs of the face plate interface portion 68 are broken, the assembly of the equipment piece 42 and equipment face plate 20 fits easily into the space between the side panels 12, 14 of the console 10. The breakable legs of the face plate interface portion 68 permit a single one-size-fits-all L-bracket 64 to be manufactured, stocked and supplied with the console 10, in contrast to custom L-brackets to fit each size of cutout 36, as was practiced in the prior art.

FIG. 11 also more clearly illustrates the tongue-and-groove type joints 23 formed between adjacent face plates 20 and between the end face plates 20 the end panels 16, 18

Figure 12:
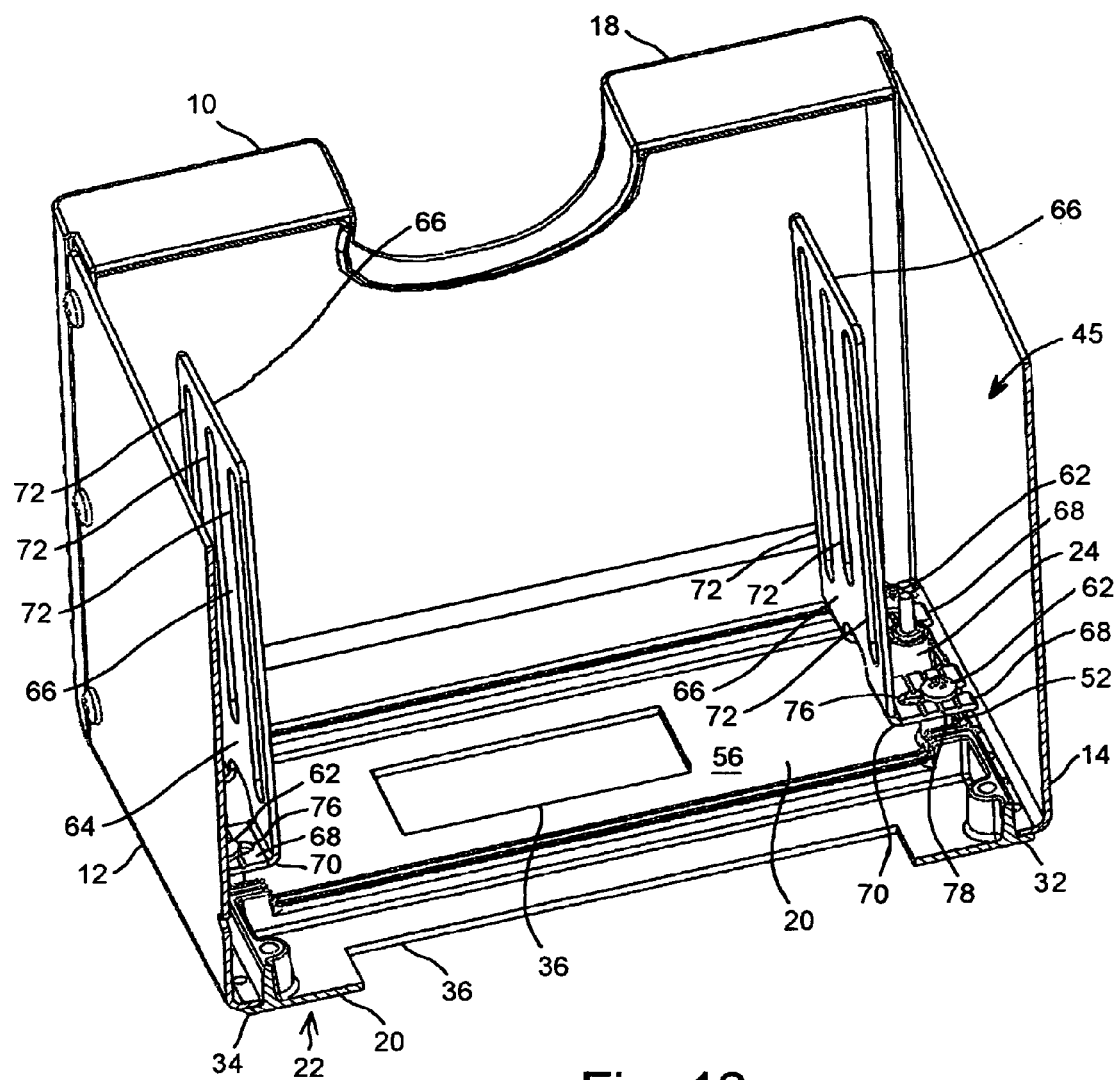
FIG. 12 is a section view of the console normal showing the pair of L-brackets secured to an inner surfaces of an equipment mounting panel.

FIG. 12 is a section view of the console 10 normal to the end panel 18 showing the pair of L-brackets 64 having their respective equipment interface portions 66 each secured to the projections 52 on the inner surfaces 56 of the face plate 20. The L-bracket 64 are shown having their respective equipment interface portions 66 projected away from the top or upwardly facing surface 22 of the console 10 into its interior 45 for supporting the equipment piece 42 (removed for clarity) relative the panel cutout 36.

While the preferred and additional alternative embodiments of the invention have been illustrated and described, it will be appreciated that various changes can be made therein without departing from the spirit and scope of the invention. Therefore, it will be appreciated that various changes can be made therein without departing from the spirit and scope of the invention. Accordingly, the inventor makes the following claims.

What is claimed is:

1. A reconfigurable vehicle console, comprising:
   a pair of substantially rigid side panels, each side panel further comprising a wall portion formed with a support surface;
   a pair of substantially rigid end panels substantially rigidly interconnected between first and second end portions of the side panels and spacing apart the respective support surfaces thereof;
   a plurality of interchangeable face plates each comprising:
      a pair of spaced apart nesting lip portions positioned to mate with the spaced apart support surfaces of the side panels,
      a tongue formed along a first joining edge thereof between the spaced apart nesting lip portions,
      a support surface formed along a joining second edge thereof between the spaced apart nesting lip portions opposite from the tongue and positioned to mate with the tongue of a different one of the face plates, and
      one or more of the face plates further comprising a cutout positioned between the nesting lip portions and the first and second joining edges and sized to receive an equipment piece therethrough; and
   a plurality of connectors operable for securing the nesting lip portions of the face plates to the support surface of each of the side panels.

2. The console of claim 1 wherein one of the end panels further comprises a tongue along an edge thereof between the interconnected end portions of the side panels and positioned to mate with the support surface positioned along the second joining edge of one of the face plates, and
   wherein a different one of the end panels further comprises a support surface positioned along an edge thereof between the interconnected end portions of the side panels and positioned to mate with the tongue of one of the face plates.

3. The console of claim 1 wherein the second joining edge of the face plate further comprises a pair of the support surfaces positioned there along and forming a groove sized to receive the tongue therein.

4. The console of claim 3 wherein one of the end panels further comprises a tongue along an edge thereof between the interconnected end portions of the side panels and positioned to mate with the groove positioned along the second joining edge of one of the face plates, and
   wherein a different one of the end panels further comprises a pair of support lips positioned along an edge thereof between the interconnected end portions of the side panels and cooperating for forming a groove therebetween sized to receive the tongue therein.

5. The console of claim 2 wherein at least the one or more of the face plates further comprising a cutout further comprises one or more junctions adjacent to each nesting lip portion on an interior surface of the face plate, each of the one or more junctions being structured for retaining the equipment piece relative thereto.

6. The console of claim 5 wherein each of the face plates further comprises a contour formed on each nesting lip portion thereof.

7. A reconfigurable vehicle console, comprising:
   opposing substantially rigid side panels, each side panel further comprising a wall portion formed with a mounting lip portion formed along a length thereof
   opposing substantially rigid end panels substantially rigidly interconnected between opposing end portions of the side panels and spacing apart the side panels a substantially uniform distance;
   a plurality of substantially rectangular interchangeable face plates each comprising:
      spaced apart nesting lip portions each positioned to mate with the mounting lip portion of one of the spaced apart side panels,
      a tongue positioned along a first joining edge thereof between the spaced apart nesting lip portions,
      a support lip positioned along a second joining edge thereof between the spaced apart nesting lip portions opposite from the tongue and positioned to mate in a lap joint with the tongue of a different one of the face plates, and
      first and second fastener clearance passages formed between interior and exterior surfaces thereof
   at least one of the face plates further comprising a cutout formed between the interior and exterior surfaces thereof and sized to receive an equipment piece at least partially therethrough, and first and second substantially upright projections positioned on the interior surface thereof between the first and second joining edges and inwardly of respective nesting lip portions, each projection further comprising a pair of fastener receivers positioned on opposite sides of the respective clamp actuator clearance passage and spaced outwardly thereof along the respective nesting lip portion and toward the first and second joining edges; and
   a plurality of removable fasteners operable through a respective one of the actuator clearance passages of one of the face plates, each fastener being operable with a portion of the mounting lip portion of the respective side panel for securing the respective nesting lip portions of the face plates thereto.

8. The console of claim 7 wherein each of the face plates further comprises a contour formed on each nesting lip portion thereof and further extending substantially continuously between the first and second joining edges thereof.

9. The console of claim 8, further comprising a plurality of substantially rigid L-brackets each comprising a substantially rigid equipment interface portion and a substantially rigid face plate interface portion substantially rigidly interconnected by a substantially rigid right angle portion forming a substantially right angle therebetween, wherein the equipment interface portion further comprises a plurality of substantially parallel equipment interface slots oriented substantially perpendicularly of the right angle portion, and wherein the face plate interface portion further comprises a pair of face plate interface slots oriented substantially perpendicularly of the right angle portion and positioned to substantially align with the pair of fastener receivers of the substantially upright projections positioned on the interior surface of the face plate.

10. The console of claim 9 wherein each of the L-brackets further comprises a plurality of substantially parallel artifacts scoring a surface of the face plate interface portion at substantially regular intervals between the right angle portion and an outer end of the face plate interface portion distal from the right angle portion.

11. The console of claim 7 wherein one of the opposing end panels further comprises a tongue positioned along an edge thereof between the interconnected end portions of the side panels and positioned to mate in a lap joint with the support lip of one of the face plates, and
wherein a different one of the first and second end panels further comprises a support lip positioned along an edge thereof between the interconnected end portions of the side panels and positioned to mate in a lap joint with the tongue of one of the face plates.

12. The console of claim 7 wherein the tongue positioned along the first joining edge of the face plate is further offset relative to the exterior surface thereof, and
wherein the face plate further comprises first and second support lips positioned along the second joining edge thereof and spaced apart to receive the tongue therebetween.

13. The console of claim 12 wherein one of the opposing end panels further comprises a tongue positioned along an edge thereof between the interconnected end portions of the side panels and positioned to be received between the spaced apart first and second support lips of one of the face plates, and
wherein a different one of the end panels further comprises first and second support lips spaced apart along an edge thereof between the interconnected end portions of the side panels and positioned to receive therebetween the tongue of one of the face plates.

14. A reconfigurable vehicle console, comprising:
opposing first and second substantially rigid end panels, the first end panel being formed with a tongue along an inwardly facing edge thereof, and the second end panel being formed with a support lip along an inwardly facing edge thereof;
opposing substantially rigid side panels substantially uniformly spaced apart by the first and second end panels substantially rigidly interconnected therewith, each side panel further comprising a substantially rigid mounting lip portion each projected inwardly toward the opposing spaced apart side panel;
a plurality of substantially rectangular interchangeable face plates each face plate being formed with a substantially identical length sized to bridge between the mounting lip portions of the opposing side panels and a width that is substantially equal to an integer multiple of a minimum unit width, and further comprising:
a substantially planar exterior surface and an opposing interior surface,
opposing first and second joining edges formed along the length thereof,
a tongue formed along the first joining edge thereof and positioned to be received on the support lip of the second end panel,
a support lip formed along the second joining edge thereof and positioned to receive there over the tongue of the first end panel,
opposing side nesting lip portions formed between the opposing first and second joining edges thereof and positioned adjacent to opposite ends thereof to be received on a respective one of the inwardly projected mounting lip portions of the spaced apart side panels,
a pair of fastener clearance passages formed between the interior and exterior surfaces and positioned inwardly of the respective opposing side nesting lip portions,
at least one of the face plates further comprising first and second substantially upright projections positioned on the interior surface thereof between the first and second joining edges and inwardly of respective opposing side nesting lip portions, each projection further comprising a pair of fastener receivers positioned on opposite sides of the respective fastener clearance passage and spaced outwardly thereof along the respective side nesting lip portions and toward the first and second joining edges, and a cutout communicating between the opposing interior and exterior surfaces and positioned between the side nesting lip portions and the first and second joining edges and sized to receive an equipment piece at least partially therethrough;
a plurality of fasteners each insertable through a respective one of the fastener clearance passages of one of the face plates and being operable between the respective side nesting lip portion and a portion of the mounting lip portion of the respective side panel for securing the face plate thereto.

15. The console of claim 14, further comprising a locator formed between at least one of the side nesting lip portions of the face plate and the mounting lip portion of one of the side panels.

16. The console of claim 15 wherein the locator further comprises a detent positioned on at least one of the side nesting lip portions of the face plate, and a plurality of detent receivers formed in the lip portion of at least one of the side panels and substantially uniformly distributed there along.

17. The console of claim 16 wherein each of the face plates further comprises a contour formed on each nesting lip portion thereof.

18. The console of claim 14 wherein the second end panel further comprises a cover lip along the inwardly facing edge thereof, the cover lip being spaced apart from support lip to receive there under the tongue of one of the face plates; and
wherein each face plate further comprises a cover lip formed along the second joining edge thereof, the cover lip being spaced apart from support lip to receive there under the tongue of a different one of the face plates.

* * * * *